(12) United States Patent
Lee

(10) Patent No.: US 9,281,891 B2
(45) Date of Patent: Mar. 8, 2016

(54) METHOD AND SYSTEM OF WIRELESSLY RETRIEVING LOST CONTENT SEGMENTS OF BROADCASTED PROGRAMMING AT A USER DEVICE FROM ANOTHER DEVICE

(75) Inventor: Sean S. Lee, Rockville, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 1428 days.

(21) Appl. No.: 11/945,868

(22) Filed: Nov. 27, 2007

(65) Prior Publication Data

US 2009/0135757 A1    May 28, 2009

(51) Int. Cl.
| | | |
|---|---|---|
| H04B 7/185 | (2006.01) | |
| H04H 20/08 | (2008.01) | |
| H04H 60/12 | (2008.01) | |
| H04L 29/08 | (2006.01) | |
| H04H 60/27 | (2008.01) | |

(52) U.S. Cl.
CPC ........... *H04B 7/18582* (2013.01); *H04H 20/08* (2013.01); *H04H 60/12* (2013.01); *H04L 67/06* (2013.01); *H04H 60/27* (2013.01)

(58) Field of Classification Search
None
See application file for complete search history.

(56) References Cited

U.S. PATENT DOCUMENTS

| | | | |
|---|---|---|---|
| 5,351,075 A | 9/1994 | Herz et al. | |
| 5,751,282 A | 5/1998 | Girard et al. | |
| 5,805,763 A | 9/1998 | Lawler et al. | |
| 6,005,562 A | 12/1999 | Shiga et al. | |
| 6,115,750 A | 9/2000 | Dillon et al. | |
| 7,024,156 B2 * | 4/2006 | Kawamata et al. | 455/3.02 |
| 7,194,753 B1 | 3/2007 | Fries et al. | |
| 7,245,819 B1 | 7/2007 | Sanders | |
| 7,283,491 B2 | 10/2007 | Ichiyoshi | |
| 7,624,417 B2 | 11/2009 | Dua | |
| 7,721,313 B2 | 5/2010 | Barrett | |
| 7,797,722 B2 | 9/2010 | Lin et al. | |
| 2002/0002706 A1 | 1/2002 | Sprunk | |
| 2003/0037339 A1 | 2/2003 | Lee | |
| 2003/0068974 A1 | 4/2003 | Kanamaluru et al. | |
| 2003/0177495 A1 | 9/2003 | Needham et al. | |
| 2004/0244058 A1 | 12/2004 | Carlucci et al. | |
| 2005/0078678 A1 * | 4/2005 | Kim et al. | 370/390 |
| 2005/0108769 A1 | 5/2005 | Arnold et al. | |
| 2005/0114568 A1 | 5/2005 | Raz | |
| 2006/0159054 A1 * | 7/2006 | Kobayashi et al. | 370/338 |
| 2007/0104456 A1 | 5/2007 | Craner | |
| 2007/0121612 A1 | 5/2007 | Nadeau et al. | |
| 2007/0157266 A1 | 7/2007 | Ellis et al. | |
| 2007/0162932 A1 | 7/2007 | Mickle et al. | |
| 2007/0250895 A1 | 10/2007 | Yamada | |
| 2008/0022330 A1 | 1/2008 | Barrett | |
| 2008/0022331 A1 | 1/2008 | Barrett | |

(Continued)

FOREIGN PATENT DOCUMENTS

| | | |
|---|---|---|
| EP | 1337113 A2 | 8/2003 |
| EP | 1838103 A2 | 9/2007 |
| WO | 2007096815 A1 | 8/2007 |

*Primary Examiner* — Mohammad Adhami

(57) ABSTRACT

A method and system includes a network having a plurality of nodes including a first mobile user device at a first node. The network also includes a second node. The system also includes a first mobile user device storing content in a memory, determining a lost content segment exists, generating a request for the lost content segment at the first mobile user device, communicating the request for the lost content to a second node of the network, receiving the lost segment from the second node and storing the lost content segment in the memory of the user device.

15 Claims, 6 Drawing Sheets

(56) References Cited

U.S. PATENT DOCUMENTS

| | | |
|---|---|---|
| 2008/0022332 A1 | 1/2008 | Barrett |
| 2008/0060030 A1* | 3/2008 | Chang et al. .................. 725/92 |
| 2008/0062911 A1* | 3/2008 | Choi et al. .................. 370/315 |
| 2008/0066135 A1 | 3/2008 | Brodersen et al. |
| 2008/0118230 A1 | 5/2008 | Kirsche |
| 2008/0141309 A1 | 6/2008 | Barsness |
| 2008/0160973 A1 | 7/2008 | Ben-Hamo |
| 2009/0010610 A1 | 1/2009 | Scholl et al. |
| 2009/0147738 A1* | 6/2009 | Larsson et al. ................ 370/329 |
| 2009/0210533 A1 | 8/2009 | Verhaegh et al. |
| 2009/0217332 A1 | 8/2009 | Hindle et al. |
| 2009/0222875 A1 | 9/2009 | Cheng et al. |
| 2009/0254599 A1 | 10/2009 | Lee et al. |
| 2009/0254949 A1 | 10/2009 | Lee et al. |
| 2009/0254951 A1 | 10/2009 | Lee et al. |
| 2009/0319824 A1* | 12/2009 | Liu et al. ........................... 714/4 |
| 2010/0192172 A1 | 7/2010 | Thomas et al. |

\* cited by examiner

METHOD AND SYSTEM OF WIRELESSLY RETRIEVING LOST CONTENT SEGMENTS OF BROADCASTED PROGRAMMING AT A USER DEVICE FROM ANOTHER DEVICE

TECHNICAL FIELD

The present disclosure relates generally to communicating content to a user and, more specifically, to communicating lost content segments of prior broadcasted programs or content to a mobile user device.

BACKGROUND

The statements in this section merely provide background information related to the present disclosure and may not constitute prior art.

Consumers increasingly desire access to various types of content, including music, videos, games, and the like. To meet these needs, content providers are increasingly investigating ways to provide content in a timely manner to consumers.

Satellite distribution systems are one way in which to provide content to various consumers. Pay-per-view and regular broadcasts are available in a satellite system. In a pay-per-view system, access is provided to users for a particular program that is watched by more than one user at the same time. Recording devices in the user devices may be used to store the content for later playback.

Mobile devices may also be used for receiving satellite signals. However, because the antenna for such devices must have a line of sight with the satellite, obstructions such as trees, bridges or high buildings may interrupt the video stream causing lost segments. This can be frustrating to operators of such devices.

SUMMARY

The present disclosure sets forth a method for utilizing a terrestrial communication network for providing lost content segments to a user device. The requested lost content may be retrieved from other devices in a network. The material may be requested by the user device and sent to the user device from another node of the network. The system may be a satellite system or other type of wireless distribution system.

In one aspect of the disclosure, a method includes forming a network having a plurality of nodes including a first mobile user device at a first node, storing content in a memory of the first mobile user device, determining a lost content segment exists, generating a request for the lost content segment at the first mobile user device, communicating the request for the lost content to a second node of the network, receiving the lost content segment at the first mobile user device from the second node and storing the lost content segment in the memory of the user device.

In a further aspect of the disclosure, a system includes a network having a plurality of nodes including a first mobile user device at a first node. The network also includes a second node. The system also includes a first mobile user device storing content in a memory, determining a lost content segment exists, generating a request for the lost content segment at the first mobile user device, communicating the request for the lost content to a second node of the network, receiving the lost segment from the second node and storing the lost content segment in the memory of the user device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
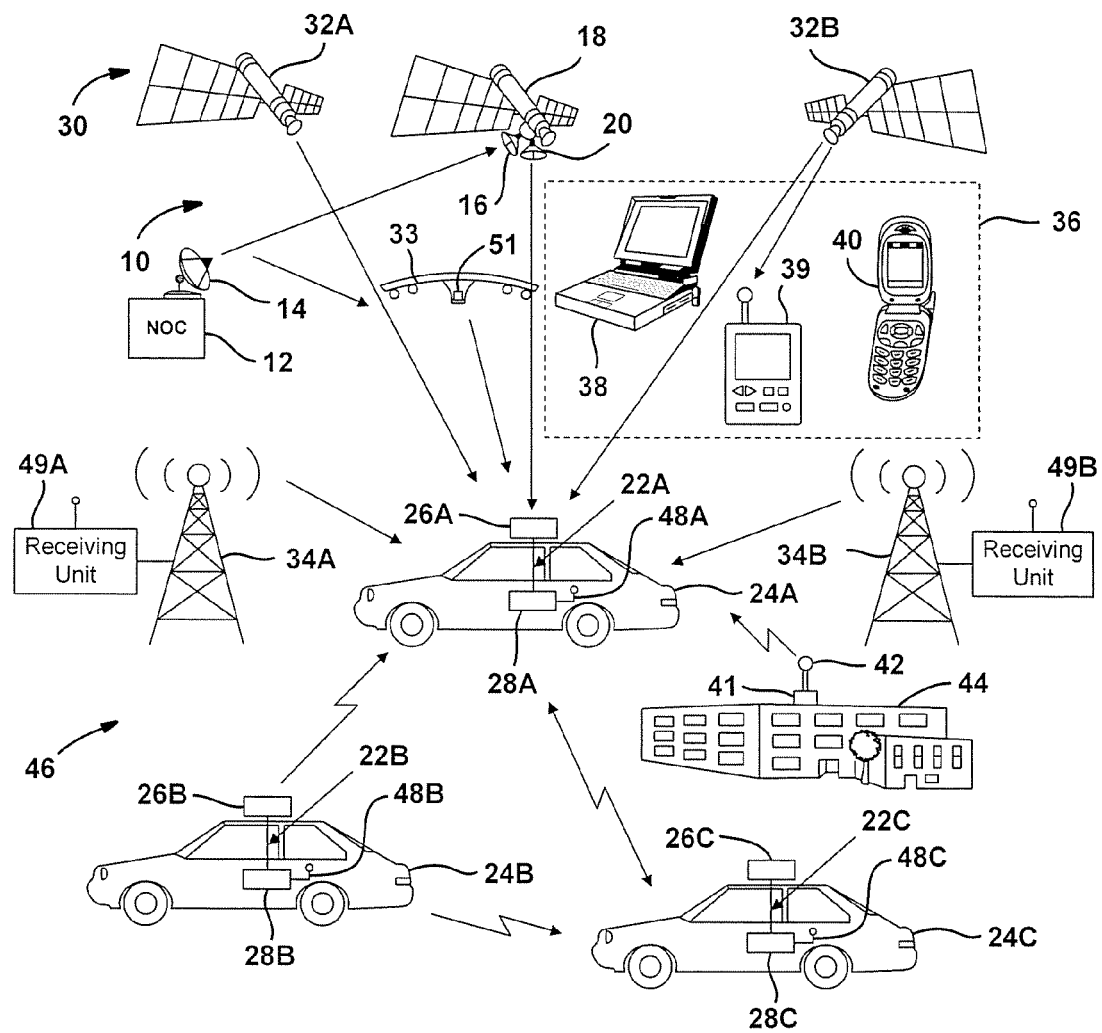
FIG. 1 is a block diagrammatic system view of a communication system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title or program will be used to refer to, for example, a media content type such as a movie itself and not the name of the movie.

The present system may be used to provide lost content packets or segments to other members in a network. In a mobile environment, blockages from buildings, trees, bridges, and the like may prevent the entire satellite signal from being received at a receiving unit. As will be described below, various devices may be included as nodes of a network to provide missing packets so that a continuous signal may be provided to the users of a receiving unit.

Referring now to FIG. 1, a satellite television broadcasting system 10 is illustrated. The satellite television broadcasting system 10 includes a network operations center 12 that generates wireless communication signals through a transmitting antenna 14 which are received by a receiving antenna 16 of a high altitude device such as a spaced-based satellite 18. The wireless communication signals, for example, may be digital, digital video, data or digital audio. As will be described below, the wireless communication signals may be entertainment content, traffic, weather, hazardous material warning areas or advertising marketing. The communication signals from the satellite may also include location-specific signals with location information therein. The location information may correspond to a geographic area in which the location specific information is valid or suitable for. A transmitting antenna 20 or the satellite 18 generates signals directed to various receiving systems including stationary systems such as those in homes or buildings as well as mobile receiving systems 22A, 22B and 22C (collectively 22). The wireless signals may have various types of information associated with them including location information. The wireless signals may also have various video and audio information associated therewith.

Each of the mobile receiving systems 22A-C is disposed within a respective automotive vehicle 24A-C. Each of the mobile receiving systems 22A-C include respective receiving antennas 26A-C that receive the wireless signals from the satellite 18 and processes the signals in a respective mobile receiving unit 28A-C. The mobile receiving units 28A-C will be further described below.

Each of the mobile receiving units 28A-28C may include a network antenna 48A-48C respectively. The network antennas 48A-C may be antennas suitable for communicating with other vehicles in a network 46. Each of the vehicles 22A-22C may represent a node of the network 46. The network 46 may be various types of wireless networks such as an 802.11a/b/g wireless network. Other types of networks may be a WiMax network. Thus, each of the vehicles 22A-22C may communicate with a content distribution network such as the satellite network and with another wireless network such as a terrestrial broadband network.

The network 46 may be referred to as a mesh network. The devices within the network 46 are only capable of communicating a certain distance. Thus, various receivers may enter and leave the range of other receivers. Thus, at any given time the network make-up may change.

The system 10 may also receive location signals from a GPS system 30 that includes a first satellite 32A and a second satellite 32B. Although only two satellites are shown, a typical GPS system includes several satellites, several of which may be in view at any particular time. Triangulation techniques may be used to determine the elevation, latitude and longitude of the system. A locating system may also include cellular towers 34A and 34B that may be used by the mobile receiving system 22 to determine a location. The towers may also be cellular phone, radio or TV towers generating location signals. Cellular phones typically include a GPS locating system. As the vehicle 24 moves, the exact coordinates in latitude and longitude may be used to determine the proper area of interest such as a designated marketing area which will control the mobile device's choices for local television and such broadcasted data.

Each of the cellular towers 34A and 34B may include respective receiving units 49A and 49B used to receive signals from the satellite and also receives signals from the network. The receiving units 49A, 49B may be referred to as stationary receiving units. The stationary receiving units 49A, 49B may form nodes of the network 46.

In addition, the satellites may also be replaced with another high altitude device such as a stratospheric platform 33 for transmitting content to the mobile device, transmitting communication signals, transmitting lost content segments and transmitting location-specific signals. Stratospheric platforms 33 are manned or unmanned airplanes, airships, or the like that fly above commercial airspace. It is envisioned that stratospheric platforms may fly at altitudes between 60,000 and 100,000 feet from the surface of the earth. Thus, the stratospheric platforms are in a significantly lower position than even low earth orbit satellites.

The stratospheric platforms 33 may also include a receiving unit 51 that is used to receive signals from the satellite 18 and communicate signals through the network 46. The receiving unit 51 may be referred to as a stationary unit since the stratospheric platform maintains a particular position above the earth. The receiving unit 51 may also become part of the wireless network 46 and thus be used to transfer lost content segments or packets to another node of the device. The receiving units 49A, 49B and 51 may also be referred to as nodes of the network 46.

The present invention may also be used for displaying and communicating various wireless communication signals on a personal mobile device 36 such as a laptop computer 38, a personal digital assistant 39, and a cellular telephone 40. It should be noted that these devices and the automotive-based devices may also receive wireless signals having various types of information associated therewith from the cellular towers 34A and 34B. Each of the personal mobile device 36 may also be a node within the network 46. That is, each of the personal devices may be used to communicate lost content segments or packets to other devices in the node.

A building 44 having a receiving unit 41 with an antenna 42 may be used as a node of the network 46. The receiving unit 41 may be referred to as a stationary unit. The receiving unit 41 may be in communication with the satellite 18 and with the network 46. The receiving unit 41 may be dedicated to replacing lost content packets into the network. The receiving unit 41 may also have a dual purpose for providing satellite television to users within the building 44 as well as providing lost content packets to other members of the network 46. For a dedicated network node, the receiving unit 41 may be operated by the operator of the content distribution system.

Figure 2:
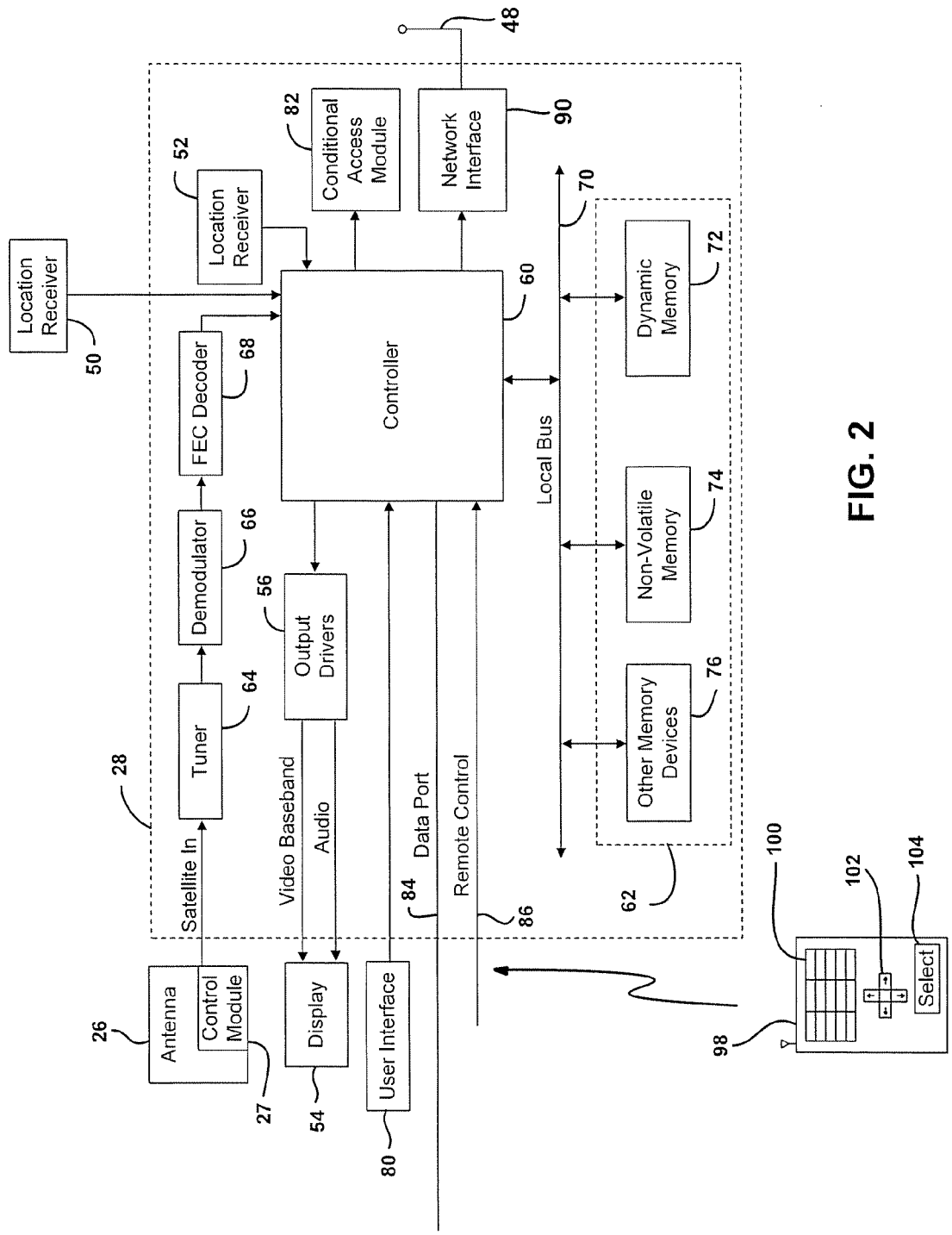
FIG. 2 is a detailed block diagrammatic view of a receiving unit of FIG. 1.

Referring now to FIG. 2, a receiving unit 28 is illustrated in further detail. Although the receiving unit 28 is illustrated as a mobile unit, the stationary receiving units 41, 49A, 49B, 51 and the personal mobile devices may also be configured in a similar manner. Antenna 26 may be various types of antennas including a rotating antenna which is used to track the relative movement of the satellite or other transponding device with respect to the vehicle. The antenna 26 may be a single antenna used for satellite television reception, or a number of antennas such as one for receiving television signals and one coupled to a location receiver 50 such as GPS receiver. The antenna 26 may also be an electronic antenna. The antenna 26 may include an internal controller 27 that controls the operation of the antenna 26. The stationary receiving units 41, 49A, 49B and 51 units may include a stationary antenna rather than a tracking antenna.

The receiving unit 28 may be coupled to one or more antenna(s) 26 with a two-way communication channel such as a wire or a wireless system. The mobile receiving unit 28 may also include a location module or location receiver 52 integrated therein. The location receiver 52 may be a GPS receiver. In a preferred embodiment, only one location receiver 50, 52 may be provided in the system. However, the location receiver 50, 52 may be part of the vehicle 24 or may be part of the mobile receiving system 22, 36. The controller 60 may be coupled directly to location receiver 52 and/or location receiver 50.

The location receiver 52 is capable of providing latitude and longitude to the controller 60. The controller 60 may be used to compare the location signals from the location receiver 50, 52 to the boundaries of the areas of interest such that the mobile device can determine which areas of interest it is within and which areas of interest it is not within. From this determination it can control IRD behavior such as allowing or disallowing display of certain audio or video channels or advertising or the like. The stationary receiving units 41, 49A, 49B and 51 units may not include the location receivers 50, 52.

The mobile receiving unit 28 includes a display 54. The display 54 may be incorporated into the device 36 or within the vehicle 24. The display 54 may include output drivers 56 used for generating the desired audio and video outputs suitable for the particular display 54. The stationary receiving units 41, 49A, 49B and 51 units may or may not include a display 54.

A controller 60 may be a general processor such as a microprocessor. The controller 60 may be used to coordinate and control the various functions of the receiving unit 28. These functions may include a tuner 64, a demodulator 66, a forward error correction decoder 68 and any buffers and other functions. The tuner 64 receives the signal or data from the individual channel. The demodulator 66 demodulates the signal or data to form a demodulated signal or data. The decoder 68 decodes the demodulated signal to form decoded data or a decoded signal. The controller 60 may be similar to that found in current DIRECTV® set top boxes which employ a chip-based multifunctional controller.

The controller 60 may include or be coupled to a local bus 70. The local bus 70 may be used to couple a memory including dynamic memory 72 such as RAM which changes often and whose contents may be lost upon the interruption of power or boot up. The bus 70 may also be coupled to a non-volatile memory 74. The non-volatile memory 74 may be an in-circuit programmable type memory. One example of a non-volatile memory is an EEPROM. One specific type of EEPROM is flash memory. Flash memory is suitable since it is sectored into blocks of data segments that may be individually erased and rewritten.

Memory 62 may be used to store the boundaries of various areas of interest. Other memory devices 76 may also be coupled to local bus 70. The other memory devices may include other types of dynamic memory, non-volatile memory, or may include such devices such as a digital video recorder or a hard disk. The display 54 may be changed under the control of controller 60 in response to the data in the dynamic memory 72 or non-volatile memory 74. Part of the memory 62 may be used as a buffer.

The controller 60 may also be coupled to a user interface 80. User interface 80 may be various types of user interfaces such as a keyboard, push buttons, a touch screen, a voice activated interface, or the like. User interface 80 may be used to select a channel, select various information, change the volume, change the display appearance, or other functions. The user interface 64 is illustrated as part of the receiving unit 28. However, should the unit 28 be incorporated into a vehicle, the user interface 80 may be located external to the mobile receiving unit such as dial buttons, voice activated system, or the like incorporated into the vehicle and interface with the mobile receiving unit.

A conditional access module card 82 (CAM) may also be incorporated into the mobile receiving unit. Access cards such as a conditional access module (CAM) cards are typically found in DirecTV units. The access card 82 may provide conditional access to various channels and wireless signals generated by the system. Not having an access card or not having an up-to-date access card 82 may prevent the user from receiving or displaying various wireless content from the system.

One user interface is a remote control device 98 having a key pad 100, an arrow key pad 102, and a select button 104 may also be provided. Inputs to the receiver 28 may be provided by the remote control device 28 or through another type of user interface 80.

The receiving unit 28 may include a network interface 90 for interfacing with other nodes of the network. The antenna 48 is used to communicate with other nodes of the network. The network interface 90 may be various types of communication cards such as an 802.11a/b/g wireless communication card, a WiMax card, or other types of wireless devices. The receiving unit 28 may be connected to multiple network interfaces such that a variety of communication protocols can be supported.

Figure 3A:
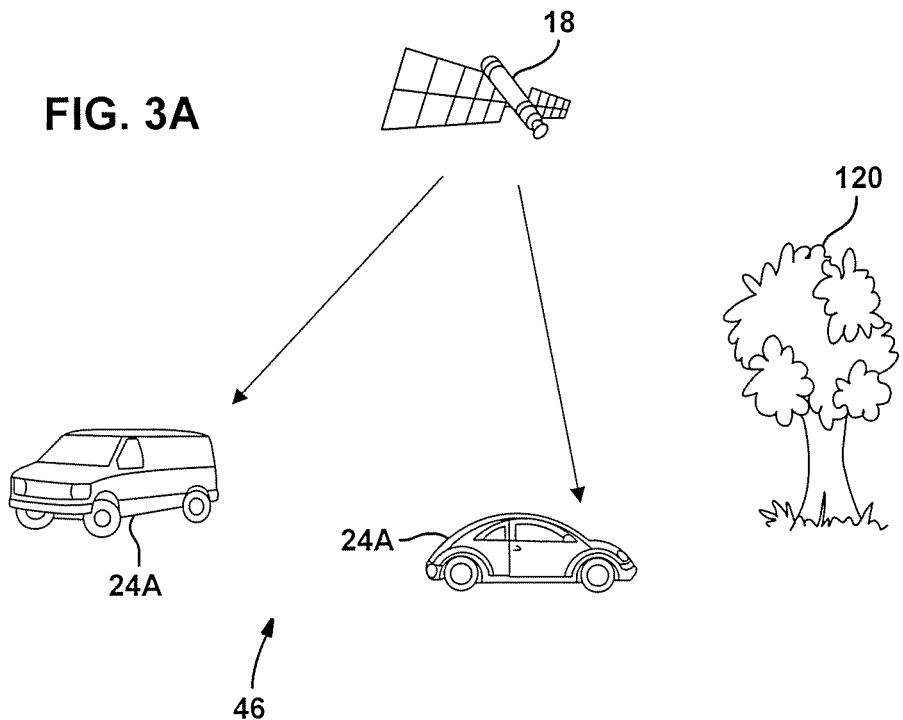
FIG. 3A is a representation of an unobstructed vehicle.

Referring now to FIG. 3A, vehicle 24A may be configured similarly to the other vehicles illustrated in FIG. 1 including the receiving unit 28. Likewise, vehicle 24B may be configured in a similar manner. Vehicle 24A has a line of sight with the satellite 18. Thus, content is received from the satellite directly and not through the network 46. The tree 120 does not block the satellite view of vehicle 24A.

Figure 3B:
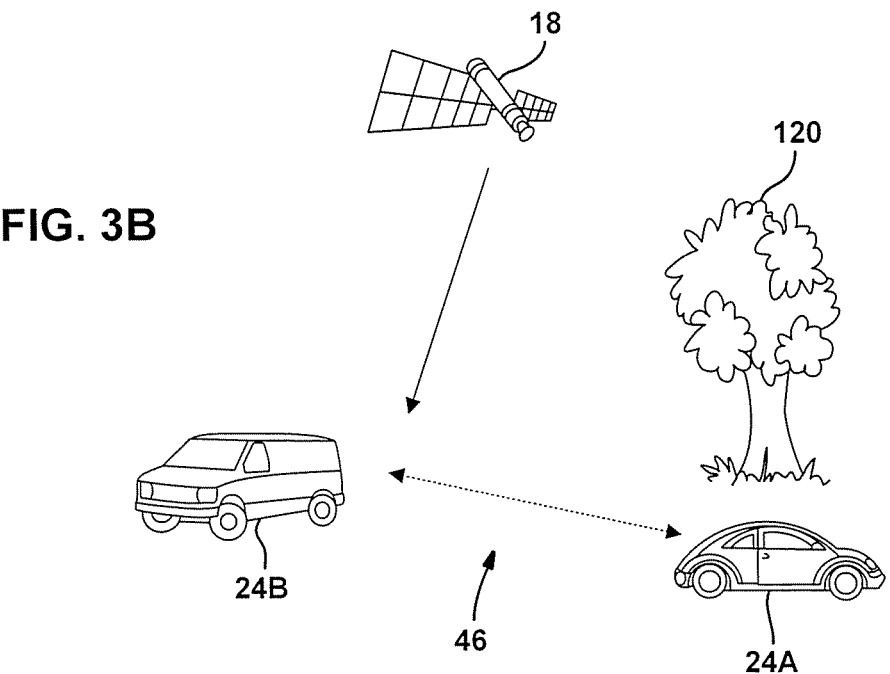
FIG. 3B is a representation of an obstructed vehicle.

Referring now to FIG. 3B, vehicle 24A no longer includes a line of sight with the satellite 18 since it is in the shadow of the tree 120. The network interface 90 within the receiving unit 28 of the vehicle may then communicate with other nodes of the network 46 such as the vehicle 24B to obtain missing packets or lost segments that form the video stream. By receiving the lost packets, the video stream may be played out within the vehicle 24A without the loss of any packets. The lost packets received from the vehicle 24B may be played out contiguously with the packets already received at the vehicle 24A. A buffer within vehicle 24A allows enough time for the vehicle 24A to contact vehicle 24B and receive and process the lost video packets or segments. When the vehicle 24A continues beyond the tree and again has a clear line of sight, the video stream transfer from the vehicle 24B may stop. Thus, one node of the network 46 may be used to supplement lost packets in the stream.

Figure 4A:
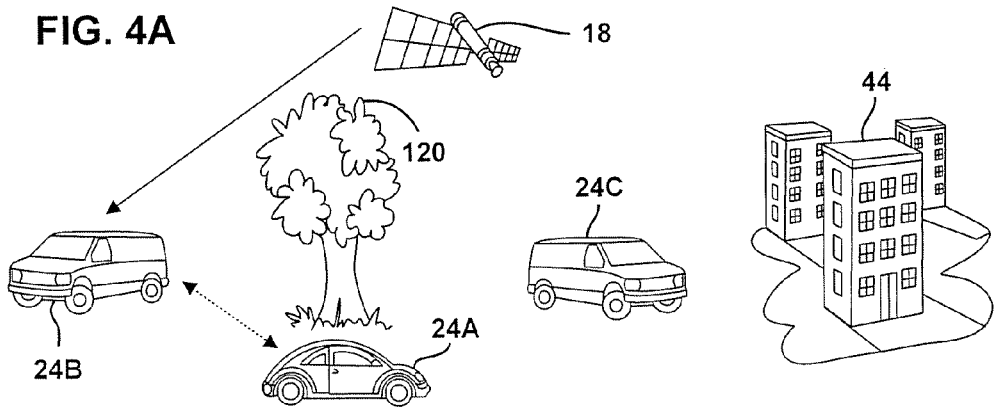
FIGS. 4A-4C is a representation of various communication scenarios.

Referring now to FIG. 4A, vehicles 24A and 24B may be tuned to a first channel while vehicle 24C may be tuned to a second channel. Vehicle 24A is communicating with vehicle 24B to receive lost segments or missing packets since the tree 120 is blocking vehicle 24A from viewing the satellite 18.

Figure 4B:
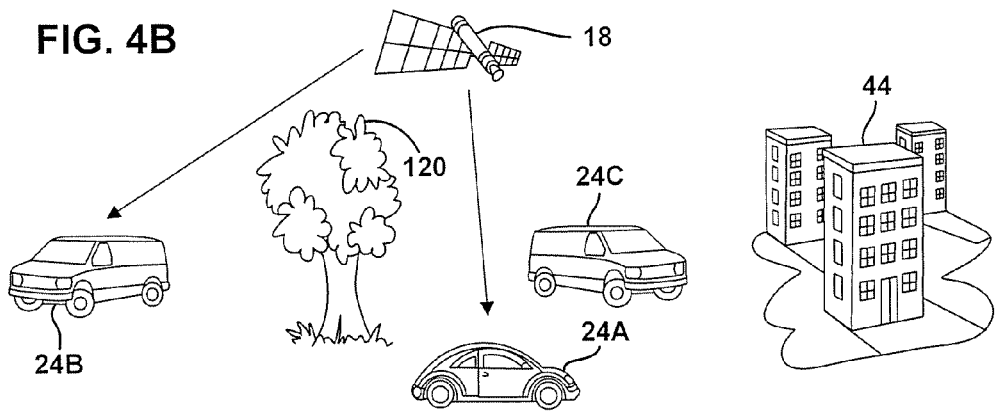

Referring now to FIG. 4B, vehicle 24A again has a line of sight with the satellite 18 since it has moved beyond the tree 120. Transfer of lost packet segments between the vehicle 24A and 24B may be stopped.

Figure 4C:
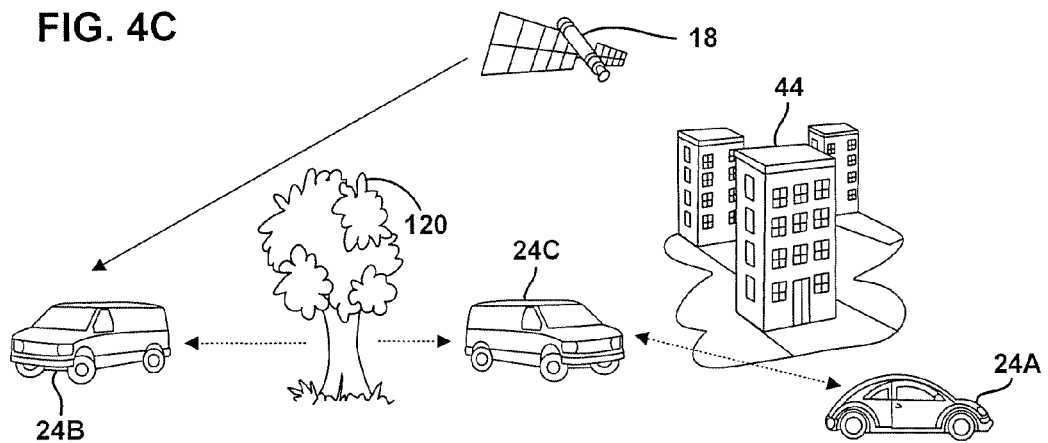

Referring now to FIG. 4C, vehicle 24A is blocked from the view of the satellite 18. The obstructed view causes lost packets and thus vehicle 24A desires to obtain the lost packets. However, vehicle 24C is not tuned to the same channel but vehicle 24B is tuned to the same channel but is out of range. Vehicle 24C may act as a relay or intermediary between vehicle 24A and 24B. That is, vehicle 24C is within the range of vehicle 24A and within the range of vehicle 24B. Signals from vehicle 24B for channel 1 may be communicated through vehicle 24C as a relay to vehicle 24A. Thus, the lost content segments or packets may be obtained by vehicle 24A from vehicle 24B through vehicle 24C.

Figure 5:
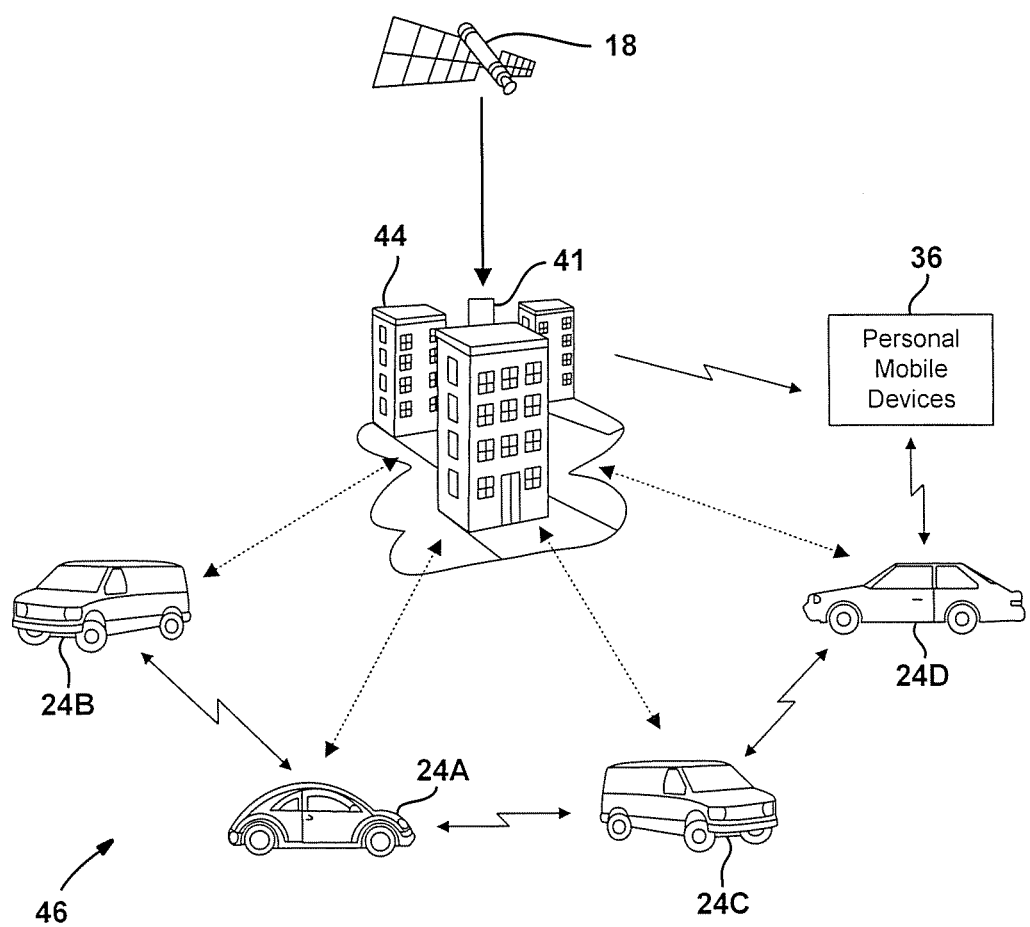
FIG. 5 is a representation of a stationary receiving device within a network.

Referring now to FIG. 5, the network 46 includes four nodes vehicles 24A-D and a fifth node a receiving unit 41 disposed within or on top of a building 44. As FIG. 5 represents, the nodes are not necessarily vehicles. As vehicles pass within the shadow of a building 44 missing video streams or packets may be obtained from the receiving unit 41. The receiving unit 41 may be a dedicated receiving unit used as a node on the network. Also, the receiving unit 41 may be a receiving unit used to provide signals within the building and as a node on a wireless network. Dedicated nodes provided by a particular service provider may also be spaced on buildings or cell towers as was illustrated in FIG. 1. The dedicated nodes may merely be nodes and not provide satellite services to users in a building. A service provider may provide nodes for the network 46 if known shadows are present.

Other nodes of the network may include the personal mobile devices 36 illustrated in FIG. 1 such as a laptop, a personal digital assistant, a dedicated video playback device, a gaming device, stationary set top boxes located within homes or other buildings and vehicles. In urban settings, more obstructions due to buildings may be present. However, in urban settings it is more likely that a significantly greater number of nodes may be in range to help the reception of lost content segments or packets from other nodes in the network.

In another embodiment, a receiver in a mobile device may not be required to include a satellite antenna. A receiver may merely be used as a receiving unit that is dependent upon other nodes for receiving the satellite signals. The receiver would generate a request for content not just lost content from other devices in the node. The other devices would then communicate the content to the requesting device.

Figure 6:
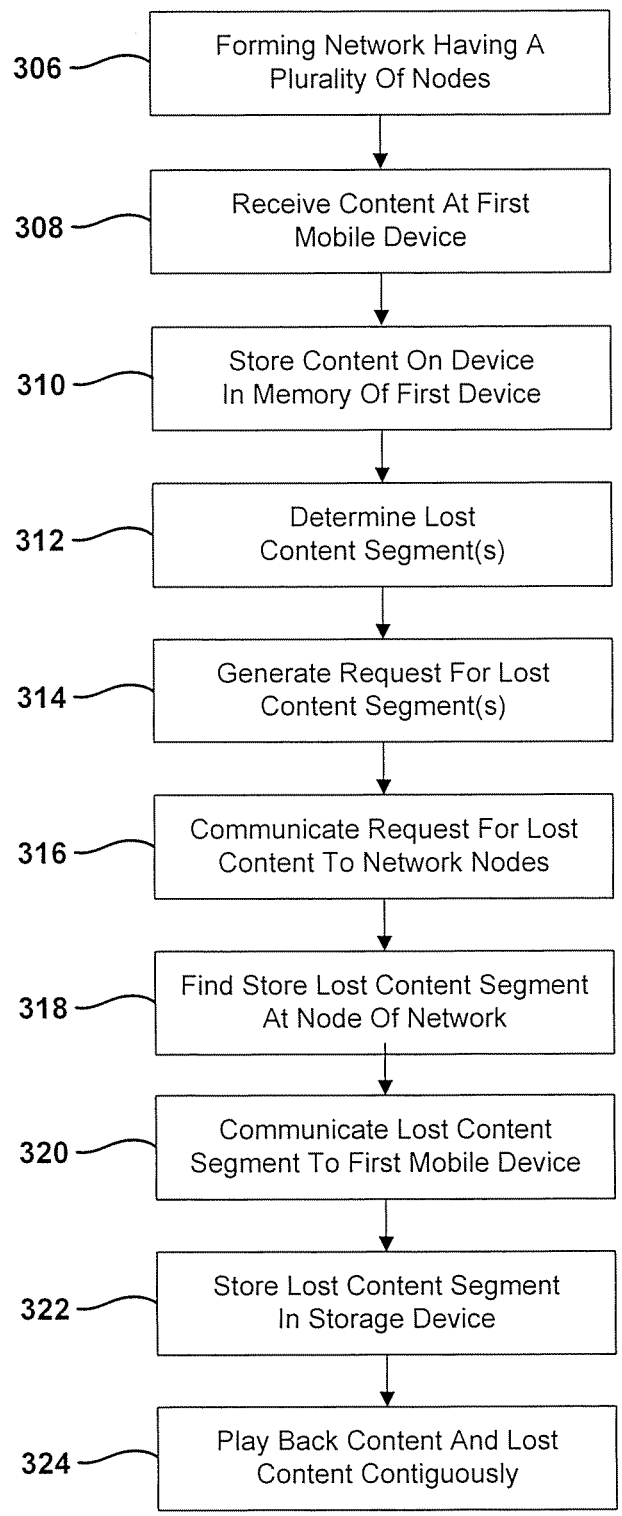
FIG. 6 is a flowchart of a method for retrieving lost segments from other nodes of the network.

Referring now to FIG. 6, a method for obtaining lost content segments or packets is provided. In step 306, a network having a plurality of nodes is established. As mentioned above, the nodes may include vehicles, personal mobile devices and stationary receiving units. The network may be referred to as a mesh network since receivers may join and leave the network due to the distance limitations of the network.

In step 308, content is received at a first mobile device from the satellite. In this step, several devices may receive the same content. The content may be stored on the user device for playback including in a buffer within the mobile device in step 310.

When receiving the content, lost segments may be formed due to a blockage of the satellite signal or equipment failures, or the like. The lost segments correspond to a portion or less than the entire piece of content. In step 312, a lost content segment or segments is determined. The lost content segments may be determined in various ways, including looking for lost signals such as audio, video or both upon receiving the content signals, reviewing a discontinuity of content headers such as data transport headers, or the like.

In step 314, a request for a replacement lost content segment is generated by the receiving device. In step 316, the request for lost content is communicated to other nodes of the network.

In step 318, a stored lost content replacement is found by another node of the network. It should be noted that only the lost content segment may be provided and not the full or entire content. In step 320, the lost content segment may be communicated to the user device.

In step 322, the lost content segment replacement is stored in the storage device. The storage device may include a digital video recorder or other types of volatile or non-volatile memory that acts as a buffer.

In step 324, the content may be played back with the replacement lost content contiguously. That is, the lost content may be played back contiguously within the content so that no noticeable gaps are provided to the content user.

It should be noted that the system is preferably automatic. That is, as content is being stored or received by the user devices or after the content has been stored within the user device, the request for a lost content segment or packets may be generated when lost content segments or packets are included within the content stored within the memory device. The controller within the user device may monitor the received content to look for lost content. By the time the content is viewed, the replacement lost content segments may be stored so that playback becomes uninterrupted by lost content segments.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:

forming a mesh network having a plurality of nodes including a first vehicle-based user device at a first node, a second vehicle-based user device at a second node, and a third vehicle-based user device at a third node;

receiving content at the first vehicle-based user device, the second vehicle-based user device, and the third vehicle-based user device directly from a satellite;

storing video content in a first memory of the first vehicle-based user device, a second memory of the second vehicle-based user device, and a third memory of the third vehicle-based user device;

determining a lost content segment is missing from the content at the first vehicle-based mobile user device;

generating a request for the lost content segment at the first vehicle-based user device;

communicating the request for the lost content to the plurality of nodes, including the second vehicle-based user device and the third vehicle-based user device, not at the first node of the mesh network;

determining, at the second vehicle-based user device, the lost content segment is at the second vehicle-based user device, in response to receiving the request for the lost content;

communicating the lost content segment from the second vehicle-based user device to the first vehicle-based mobile user device through the mesh network;

receiving the lost content segment at the first vehicle-based mobile user device; and storing the lost content segment in the first memory of the first vehicle-based mobile user device.

2. The method as recited in claim 1 wherein the lost content comprises a plurality of video packets.

3. The method as recited in claim 1 wherein storing content in a memory of the first vehicle-based user device comprises storing content in a buffer.

4. The method as recited in claim 1 wherein storing content in a memory of the first vehicle-based user device comprises storing content in a digital video recorder.

5. The method as recited in claim 1 wherein storing content in a memory of the first vehicle-based user device comprises storing content in a non-volatile memory.

6. The method as recited in claim 1 wherein storing content in a memory of the first vehicle-based user device comprises storing content in a hard disk.

7. The method as recited in claim 1 wherein communicating the request for the lost content to the second node of the mesh network comprises communicating the request for the lost content to the second node of the network through the third node.

8. The method as recited in claim 7 wherein receiving the lost content segment at the first vehicle-based user device from the second node comprises receiving the lost content segment at the first vehicle-based user device from the second node through the third node.

9. The method as recited in claim 1 wherein determining the lost content segment is missing comprises determining the lost content from program-associated data.

10. The method as recited in claim 1 wherein determining the lost content segment is missing comprises determining the lost content from data transport packet headers.

11. A method as recited in claim 1 further comprising communicating content to the first vehicle-based user device through a satellite network from a service provider.

12. A system comprising:
a mesh network having a plurality of nodes including a first vehicle-based user device at a first node, second vehicle-based user device at a second node, and a third vehicle-based user device at a third node; and
said first vehicle-based user device, said second vehicle-based user device, and said third vehicle-based user device receiving video content directly from a satellite source and storing the video content in memory;
said first vehicle-based user device determining a lost video content segment is missing from the content received at the first vehicle-based user device;
said first vehicle-based user device generating a request for the lost video content segment and communicating the request for the lost video content segment to the plurality of nodes, including the second vehicle-based user device at the second node and the third vehicle-based user device at the third node, through the mesh network;
said second vehicle-based user device determining the lost content segment is at the second vehicle-based user device, in response to receiving the request for the lost content;
receiving the lost video content segment from the second vehicle-based user device through the mesh network and storing the lost content segment in memory at the first vehicle-based user device.

13. A system as recited in claim 12 wherein the lost content comprises a plurality of packets.

14. A system as recited in claim 12 wherein the memory at the first vehicle-based mobile user device comprises a buffer.

15. A system as recited in claim 12 wherein the first vehicle-based user device communicates the request for the lost content to the second node through the third node.

\* \* \* \* \*